| United States Patent [19] | [11] | 4,128,626 |
|---|---|---|
| Merchant | [45] | Dec. 5, 1978 |

[54] PURIFICATION OF GASEOUS HYDROGEN CHLORIDE

[75] Inventor: Dihrendra R. Merchant, Paducah, Ky.

[73] Assignee: Pennwalt Corporation, Philadelphia, Pa.

[21] Appl. No.: 354,715

[22] Filed: Apr. 26, 1973

Related U.S. Application Data

[63] Continuation-in-part of Ser. No. 153,839, Jun. 16, 1971, abandoned.

[51] Int. Cl.$^2$ .............................................. C01B 7/08
[52] U.S. Cl. ...................................... 423/488; 423/240
[58] Field of Search ........................ 423/240, 481, 488

[56] References Cited

U.S. PATENT DOCUMENTS

| 2,321,282 | 6/1943 | Comstock | 423/488 |
| 2,919,174 | 12/1959 | Pring | 423/240 |
| 3,140,916 | 7/1964 | Lowdermilk | 423/240 |
| 3,464,787 | 9/1969 | Carson | 423/488 |
| 3,472,789 | 10/1969 | Cottrell | 423/490 |

Primary Examiner—Brian Hearn

[57] ABSTRACT

A gaseous mixture of hydrogen chloride containing a minor proportion of hydrogen fluoride is contacted with solid, particulate, substantially anhydrous calcium chloride to remove said HF contamination.

6 Claims, No Drawings

PURIFICATION OF GASEOUS HYDROGEN CHLORIDE

This application is a continuation-in-part of application Ser. No. 153,839, filed June 16, 1971, now abandoned.

This invention relates to the removal of contaminants from gaseous hydrogen chloride. More particularly, this invention concerns the process of contacting gaseous hydrogen chloride containing hydrogen fluoride as an undesirable impurity with solid, particulate, substantially anhydrous calcium chloride to remove said hydrogen fluoride contamination therefrom.

In commercial processes for the production of fluorinated hydrocarbons (useful as refrigerants, blowing agents and aerosol propellants, such as $CCl_3F$, $CCl_2F_2$, $CClF_3$, $CHCl_2F$, $CHClF_2$, $CHF_3$ and the like) involving the fluorination with HF of chlorinated hydrocarbons, a large amount of anhydrous hydrogen chloride containing small but significant proportions of hydrogen fluoride is obtained as a by-product, which hydrogen chloride by-product cannot be discarded for obvious economic and ecological reasons. However, this contaminated hydrogen chloride must be purified so that the HCl can be used in industrial applications, for example, in oxychlorination reactions and in the treatment of brine used in electrolytic chlorine production, the presence of HF in such systems being intolerable.

It is known to pass a gaseous mixture of hydrogen chloride and hydrogen fluoride through an aqueous solution of calcium chloride, whereby the hydrogen fluoride reacts with the calcium chloride in solution to form calcium fluoride as a precipitated solid that is recoverable by filtration (see F. R. Lowdermilk, U.S. Pat. No. 3,140,916, July 14, 1964). Such a multi-step technique has several serious disadvantages stemming from the problems in dealing with an aqueous system comprised of HCl, $CaCl_2$, and $CaF_2$. This mixture is highly corrosive, and the precipitated $CaF_2$-in-water mixture forms an abrasive slurry, both conditions being very injurious to plant equipment.

It has now been discovered, in accordance with this invention, that contacting a gaseous mixture of hydrogen chloride which contains a minor proportion of hydrogen fluoride with solid, particulate, substantially anhydrous calcium chloride converts said hydrogen fluoride to additional hydrogen chloride in a highly efficient and economical manner, while producing a valuable particulate calcium fluoride product, according to the reaction:

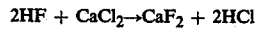
$$2HF + CaCl_2 \rightarrow CaF_2 + 2HCl$$

The calcium fluoride by-product, recovered as an incident to the purification of gaseous hydrogen chloride herein, is useful as a raw material for preparing hydrofluoric acid. These particulate solids are easily handled and are readily recoverable from the process equipment used for the gas-solids contact described herein.

The impure hydrogen chloride gaseous mixture fed to the process of this invention may contain from 0.1 to about 5 but usually up to about 2 weight percent HF based on total weight of the gaseous mixture. In addition, there may be present in admixture therewith up to about 70 weight percent of volatile halogenated hydrocarbons, i.e., chlorofluorohydrocarbons, chlorohydrocarbons and fluorohydrocarbons such as $CCl_4$, $CCl_3F$, $CCl_2F_2$, $CClF_3$, $CHCl_2F$, $CHClF_2$, $CHF_3$, $CHCl_3$, etc., which do not interfere with the conversion reaction and undergo no discernible change from contact with the $CaCl_2$. The product HCl can be separated from the organic constituents by distillation to provide an anhydrous HCl gas, or by absorption in water. In the latter technique, the small amount of organic material that is absorbed in the aqueous acid may be easily removed by blowing with air or other gas or by adsorption on activated carbon or molecular sieves. The product HCl gas, essentially free of HF contamination, can be used to make concentrated, aqueous hydrochloric acid solution which is of sufficiently high quality to market as a merchant chemical at premium prices received for high-grade hydrochloric acid.

The particulate calcium chloride used in carrying out the process embodied herein may range from powdery material to granular type to pellets. In the preferred embodiments, the calcium chloride is in pellet form, e.g., having a particle size of from about 0.025 to about 0.375 inch.

The temperature at which the gaseous hydrogen chloride mixture is contacted with the particulate $CaCl_2$ may be in the range of about 50° F. to about 120° F., preferably from about 70° F. to 100° F. It is desirable to maintain the temperature of reaction above the dew point of the gas to prevent any organics present therein from condensing in the contact column. Pressures may vary from essentially atmospheric up to about 250 psig., depending on other process conditions. As the system embodied in this invention is anhydrous, corrosion problems are minimized and conventional materials of construction, e.g., ordinary carbon steel, can be used for the process equipment.

An unexpected result provided by this invention is the efficiency of conversion of HF to HCl obtained at extremely high gas flow rates. For example, the product HCl gas, after treatment as herein described, will generally contain less than 0.01 weight percent HF (and, as shown by the following examples, usually less than about 0.0005 to 0.008% HF), although flow rates of the feed gas may vary from as much as about 300 to about 600 cu. ft. per hour per cu. ft. of particulate $CaCl_2$, measured at standard conditions of 15 psia. pressure and 70° F. temperature. Stated differently, the foregoing results of HF removal and conversion are obtained using periods of contact of the gaseous HCl mixture with the anhydrous calcium chloride (also referred to as retention time) of from about 20 to about 100 seconds. The quality of the product HCl gas is influenced by these flow rates, as is demonstrated in the following representative examples, which illustrate and clarify the invention.

EXAMPLE 1

A by-product gaseous mixture is obtained from the hydrofluorination of carbon tetrachloride comprising hydrogen chloride containing about 70 wt. % organics (mostly $CCl_3F$ and $CCl_2F_2$) and 1.25% HF, based on the weight of the HCl. The gas is passed through a one inch diameter, 21-inch long column filled with anhydrous calcium chloride granules, (4–20 mesh, U.S. Standard Sieve Series) at about 75° F. and a pressure of 15 psia. Superficial velocity of the gas through the column is 6 ft/min. and average retention time is of the order of 20 seconds. The HF content of the treated hydrogen chloride gas is reduced to 0.004%.

EXAMPLE 2

The procedure of the previous example is repeated using a hydrogen chloride gaseous feed containing from 0.5 to 1.5% HF. After passage through the anhydrous, particulate calcium chloride, the HF content of the gas is 0.005%.

EXAMPLE 3

A gaseous hydrogen chloride stream obtained as by-product from the hydrofluorination of $CHCl_3$ containing about 69 wt. % organics (mostly $CHClF_2$ and $CHF_3$) and 4.7% HF (based on the weight of the HCl) is contacted with granular, anhydrous $CaCl_2$ as in the preceding examples. The product HCl contains from 0.005 to 0.008% HF.

EXAMPLE 4

A contaminated hydrogen chloride gas by-product stream obtained from the hydrofluorination of $CCl_4$, containing about 69 wt. % organics and from 1.5 to 2% HF (based on the weight of the HCl) is passed at 65°–110° F. and 75 psig through a bed of 6000 lbs. of granular $CaCl_2$ (particle size distribution of 4–20 mesh) in a 4 ft. diameter tower, at 10,000 lbs/hr. feed rate, so that the retention time is 38 seconds. The processed HCl product gas contains 0.002% HF.

EXAMPLE 5

Contaminated hydrogen chloride gas produced as a by-product in the hydrofluorination of $CCl_4$, and containing about 69 wt. % organics ($CCl_3F$ and $CCl_2F_2$) is passed through a bed of granular $CaCl_2$, 6.5 to 7.5 feet deep (about 6000 to 6400 lbs. $CaCl_2$) in a series of runs through a 4 ft. diameter tower at feed rates ranging from 5600 to 11,000 lbs/hour of feed gas. The particle sizes of the $CaCl_2$ ranges from 4 mesh to 20 mesh. The results of the various runs are tabulated in the following table:

| Run No. | HCl feed rate, lbs./hr. | Total HCl feed, lbs. | Feed Gas temp. ° F | $CaCl_2$ column pressure, psig | Average retention time of gas in column, seconds | HF content in HCl gas, ppm* Feed | HF content in HCl gas, ppm* Product |
|---|---|---|---|---|---|---|---|
| 1 | 2830 | 130,000 | 65 | 70 | 38 | 5500 | 6 |
| 2 | 3200 | 155,000 | 90 | 137 | 70 | 5000 | 2–5 |
| 3 | 3040 | 100,000 | 65 | 70 | 35 | 4000 | 10–12 |
| 4 | 3460 | 31,000 | 70 | 60 | 29 | 5000 | 50 |
| 5 | 3750 | 120,000 | 70 | 60 | 24 | 4300 | 14 |
| 6 | 3330 | 57,000 | 65 | 55 | 27 | 3300 | 95 |
| 7 | 2620 | 100,000 | 105 | 165–225 | 105 | 2000 | 15–20 |
| 8 | 3240 | 39,000 | 75 | 60 | 25 | 15000 | 100 |
| 9 | 2250 | 79,000 | 75 | 80 | 60 | 6800 | 20 |
| 10 | 2300 | 28,000 | 75 | 70 | 54 | 5500 | 58 |
| 11 | 2170 | 78,000 | 80 | 60 | 46 | 3700 | 19–50 |
| 12 | 1900 | 130,000 | 70 | 100 | 90 | 4100 | 13 |
| 13 | 2120 | 150,000 | 75 | 150 | 108 | 4200–6000 | 11 |

*ppm = parts per million

I claim:

1. A process for purifying gaseous hydrogen chloride containing hydrogen fluoride contamination which comprises contacting with solid, particulate, substantially anhydrous calcium chloride a gaseous mixture of hydrogen chloride containing from 0.1 to about 5 percent by weight of hydrogen fluoride, at a temperature within the range of about 50° F. to about 120° F., to effect substantial removal of the hydrogen fluoride from the gaseous hydrogen chloride, whereby the hydrogen fluoride content thereof is reduced to less than 0.01 weight percent.

2. A process according to claim 1 wherein the gaseous hydrogen chloride feed contains in admixture therewith volatile halogenated hydrocarbons.

3. A process according to claim 2 wherein the HF content of the gaseous hydrogen chloride feed mixture is within the range of 0.1 to about 2 percent by weight.

4. A process according to claim 1 wherein the contact temperature is in the range of about 70° F. to about 100° F.

5. A process for purifying a gaseous hydrogen chloride mixture containing minor proportion of hydrogen fluoride contamination which comprises passing said mixture in contact with solid, particulate, substantially anhydrous calcium chloride to effect substantial removal of the hydrogen fluoride from said mixture.

6. A process according to claim 5 wherein the gaseous hydrogen chloride mixture contains in admixture therewith volatile halogenated hydrocarbons.

* * * * *